US012128536B2

United States Patent
Abu Antoun et al.

(10) Patent No.: US 12,128,536 B2
(45) Date of Patent: Oct. 29, 2024

(54) WORKING TOOL

(71) Applicant: Hilti Aktiengesellschaft, Schaan (LI)

(72) Inventors: Chafic Abu Antoun, Buchs (CH); Tilo Dittrich, Feldkirch (AT); Albert Binder, Buchs (CH); Manuel Gut, Göfis (AT); Florian Schmid, Buchs (CH); Jasmin Smajic, Schöfflisdorf (CH)

(73) Assignee: Hilti Aktiengesellschaft, Schaan (LI)

( * ) Notice: Subject to any disclaimer, the term of this patent is extended or adjusted under 35 U.S.C. 154(b) by 164 days.

(21) Appl. No.: 17/783,464

(22) PCT Filed: Dec. 11, 2020

(86) PCT No.: PCT/EP2020/085685
§ 371 (c)(1),
(2) Date: Jun. 8, 2022

(87) PCT Pub. No.: WO2021/122351
PCT Pub. Date: Jun. 24, 2021

(65) Prior Publication Data
US 2023/0018142 A1    Jan. 19, 2023

(30) Foreign Application Priority Data

Dec. 20, 2019  (EP) .................................... 19218916

(51) Int. Cl.
*B25C 1/06* (2006.01)
*H02K 33/00* (2006.01)

(52) U.S. Cl.
CPC ............... *B25C 1/06* (2013.01); *H02K 33/00* (2013.01)

(58) Field of Classification Search
CPC .... B25C 1/06; B25C 1/04; B25C 1/08; B25C 1/00; B25C 1/047; B25C 5/15;
(Continued)

(56) References Cited

U.S. PATENT DOCUMENTS

| 4,480,523 A | 11/1984 | Young et al. |
| 5,886,442 A | 3/1999 | Ogino et al. |

(Continued)

FOREIGN PATENT DOCUMENTS

| CN | 114786876 A | 7/2022 |
| DE | 20 2011 050 847 U1 | 1/2012 |

(Continued)

OTHER PUBLICATIONS

Mecklenburg, Machine Translation of WO 2019/211264 A1, Nov. 2019 (Year: 2024).*

(Continued)

*Primary Examiner* — Veronica Martin
(74) *Attorney, Agent, or Firm* — Leydig, Voit & Mayer, Ltd.

(57) ABSTRACT

A tool for working a substrate, having a stator and a working piston, which is intended to move relative to the stator along a working axis, and having a drive, which is intended to drive the working piston along the working axis from a starting position onto the substrate, the drive having a stator coil arranged on the stator and being intended to apply electrical current of a first current intensity $I_1$ to the stator coil in order to generate a magnetic field which accelerates the working piston relative to the stator, the drive having a piston coil arranged on the working piston and being intended to apply electrical current of a second current intensity $I_2$ to the piston coil in order to generate a magnetic field which accelerates the working piston relative to the stator, the second current intensity $I_2$ being less than the first current intensity $I_1$.

20 Claims, 4 Drawing Sheets

Figure 1:
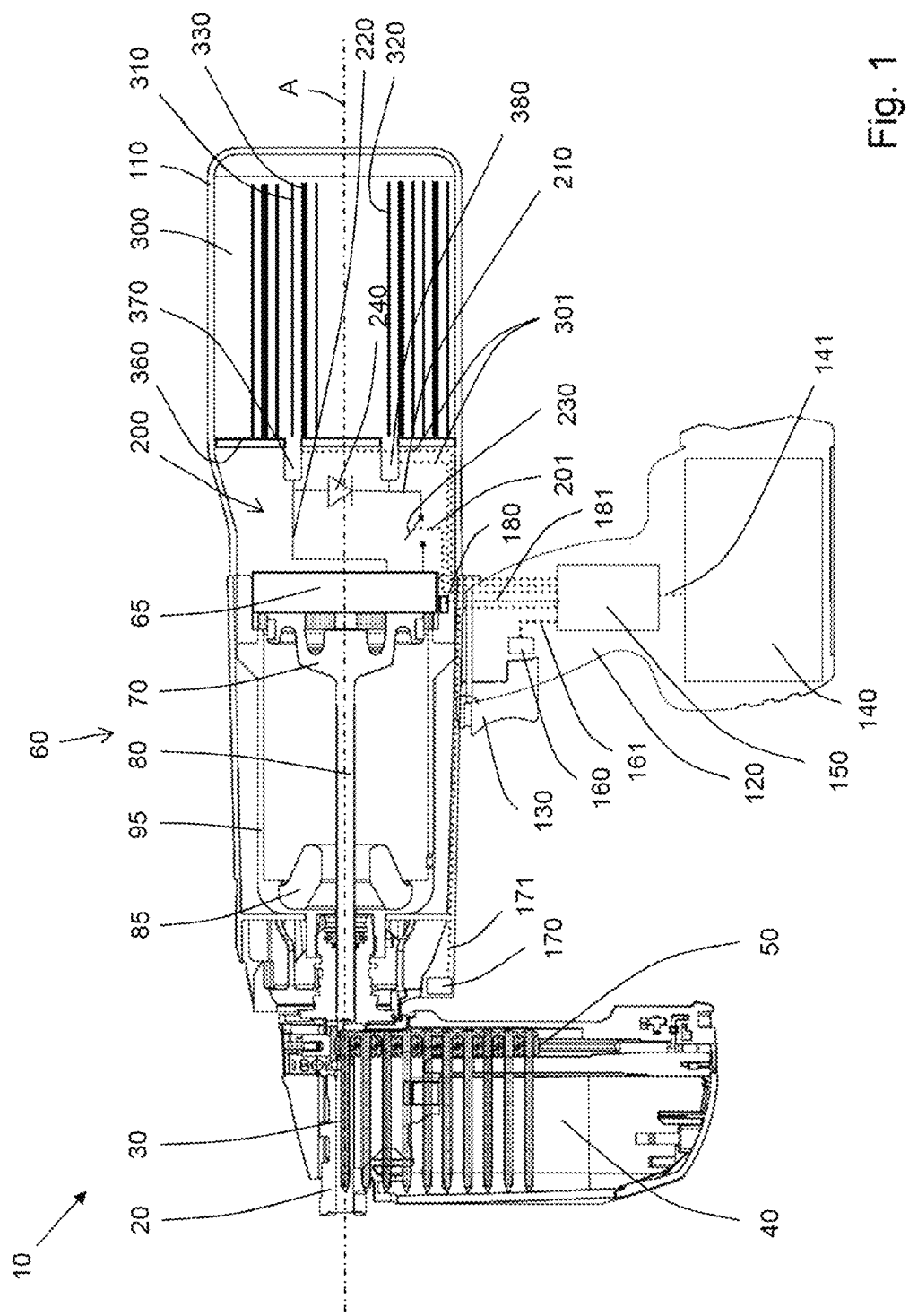

(58) Field of Classification Search
CPC ........ B25C 1/008; H02K 33/00; H02K 33/02; H02K 41/025; H02K 41/0352; H02K 41/0354; H02K 7/145
See application file for complete search history.

(56) References Cited

U.S. PATENT DOCUMENTS

| | | | |
|---|---|---|---|
| 6,049,146 | A | 4/2000 | Takara |
| 6,830,173 | B2 | 12/2004 | Barber et al. |
| 9,312,058 | B2 | 4/2016 | Michaelsen et al. |
| 9,900,495 | B2 | 2/2018 | Kang et al. |
| 2013/0200966 | A1 | 8/2013 | Michaelsen et al. |
| 2017/0332004 | A1 | 11/2017 | Kang et al. |
| 2019/0326805 | A1 | 10/2019 | Mecklenburg et al. |
| 2021/0060750 | A1 | 3/2021 | Dittrich et al. |
| 2023/0012189 | A1 | 1/2023 | Abu Antoun et al. |
| 2023/0018142 | A1 | 1/2023 | Abu Antoun et al. |

FOREIGN PATENT DOCUMENTS

| | | | |
|---|---|---|---|
| JP | S54-41682 A | 4/1979 | |
| JP | S57-8089 A | 1/1982 | |
| JP | S59-160921 A | 9/1984 | |
| JP | H7-4676 B2 | 1/1995 | |
| JP | 2000-291530 A | 10/2000 | |
| WO | WO 2017/196023 A1 | 11/2017 | |
| WO | 2018/104406 A1 | 6/2018 | |
| WO | WO-2019211264 A1 * | 11/2019 | ............. B25C 1/047 |
| WO | 2019/233845 A1 | 12/2019 | |
| WO | 2021/122351 A1 | 6/2021 | |

OTHER PUBLICATIONS

International Searching Authority, International Search Report and Written Opinion in International Application No. PCT/EP2020/085685, mailed Feb. 18, 2021.

* cited by examiner

WORKING TOOL

CROSS-REFERENCE TO RELATED APPLICATIONS

This patent application is the U.S. National Stage of International Patent Application No. PCT/EP2020/085685, filed Dec. 11, 2020, which claims the benefit of European Patent Application No. 19218916.5, filed Dec. 20, 2019, which are each incorporated by reference.

The present invention relates to a tool, such as for example a setting tool for driving fastening elements into a substrate.

Such tools often have a working piston, which is intended to move along a working axis. The working piston is driven by a drive, which accelerates the working piston. WO 2018/104406 A1 describes a drive, which has an electrical capacitor, a squirrel-cage rotor arranged on the working piston and an excitation coil, which during rapid discharge of the capacitor is flowed through by current and generates a magnetic field that accelerates the working piston.

Setting tools usually have a receptacle for a fastening element, from which a fastening element received therein is transferred into the substrate along a working axis. For this, the working element is driven toward the fastening element along the working axis by the drive. U.S. Pat. No. 6,830,173 B2 discloses a setting tool with a drive, which has an electrical capacitor and a coil.

The object of the present invention is to provide a setting tool of the aforementioned type with which high efficiency and/or good setting quality are/is ensured.

The object is achieved with a preferably hand-held tool for working a substrate, having a stator and a working piston, which is intended to move relative to the stator along a working axis, and also having a drive, which is intended to drive the working piston from a starting position along the working axis onto the substrate, the drive having a stator coil arranged on the stator and being intended to apply electrical current of a first current intensity $I_1$ to the stator coil in order to generate a magnetic field which accelerates, preferably repels, the working piston relative to the stator, the drive having a piston coil arranged on the working piston and being intended to apply electrical current of a second current intensity $I_2$ to the piston coil in order to generate a magnetic field which accelerates, preferably repels, the working piston relative to the stator, the second current intensity $I_2$ being less than the first current intensity $I_1$.

An advantageous embodiment is characterized in that the drive has a piston coil capacitor, the piston coil being electrically connectable to the piston coil capacitor in order during rapid discharge of the piston coil capacitor to be flowed through by the electrical current of the first current intensity $I_1$. Another advantageous embodiment is characterized in that the drive has a stator coil capacitor, the stator coil being electrically connectable to the stator coil capacitor in order during rapid discharge of the stator coil capacitor to be flowed through by the electrical current of the second current intensity $I_2$.

An advantageous embodiment is characterized in that the piston coil has a piston coil axis and the stator coil has a stator coil axis, which is oriented parallel to the piston coil axis. The stator coil axis preferably coincides with the piston coil axis. The piston coil and the stator coil are preferably flowed through by current in opposite directions during the rapid discharge of the piston coil capacitor and the stator coil capacitor in order to generate opposing magnetic fields. The piston coil capacitor and the stator coil capacitor are likewise preferably identical. The piston coil and the stator coil are particularly preferably connected electrically in parallel with one another.

An advantageous embodiment is characterized in that the stator coil has a first number of turns $N_1$ and the piston coil has a second number of turns $N_2$, which differs from the first number of turns $N_1$. Preferred is $N_2 > N_1$. Also preferred is essentially $N_1 \cdot I_1 = N_2 \cdot I_2$.

An advantageous embodiment is characterized in that the stator has two electrical stator contacts and the working piston has two electrical piston contacts sliding in each case on one of the electrical stator contacts in order to apply the electrical current of the second current intensity $I_2$ to the piston coil. Preferably, the electrical stator contacts have in each case a contact rail and the electrical piston contacts have in each case a contact brush or a slip ring, or vice versa.

An advantageous configuration is characterized in that the tool is designed as a setting tool for driving fastening elements into a substrate, having a receptacle which is intended to receive a fastening element, the working piston being intended to transfer a fastening element received in the receptacle into the substrate along the working axis, and the drive being intended to drive the working piston onto the fastening element along the working axis.

In the context of the invention, a capacitor should be understood as meaning an electrical component that stores electrical charge and the associated energy in an electrical field. In particular, a capacitor has two electrically conducting electrodes, between which the electrical field builds up when the electrodes are electrically charged differently. In the context of the invention, a fastening element should be understood as meaning for example a nail, a pin, a clamp, a clip, a stud, in particular a threaded stud, or the like.

A soft magnetic material in the context of the invention should be understood as meaning a material which has a high magnetic saturation flux density and in particular a small coercive field strength, and thus reinforces a magnetic field penetrating the material. In particular, the soft magnetic material of the stator frame and/or the piston frame has a saturation flux density of at least 1.0 T, preferably at least 1.3 T, particularly preferably at least 1.5 T. In the context of the invention, an electrically conducting material should be understood as meaning a material which has a high specific electrical conductivity, so that a magnetic field passing through the material generates eddy currents in the material. A soft magnetic and/or electrically conductive material preferably consists of a ferromagnetic material, particularly preferably a ferromagnetic metal, for example iron, cobalt, nickel, or an alloy with one or more ferromagnetic metals as the main component.

Figure 2:
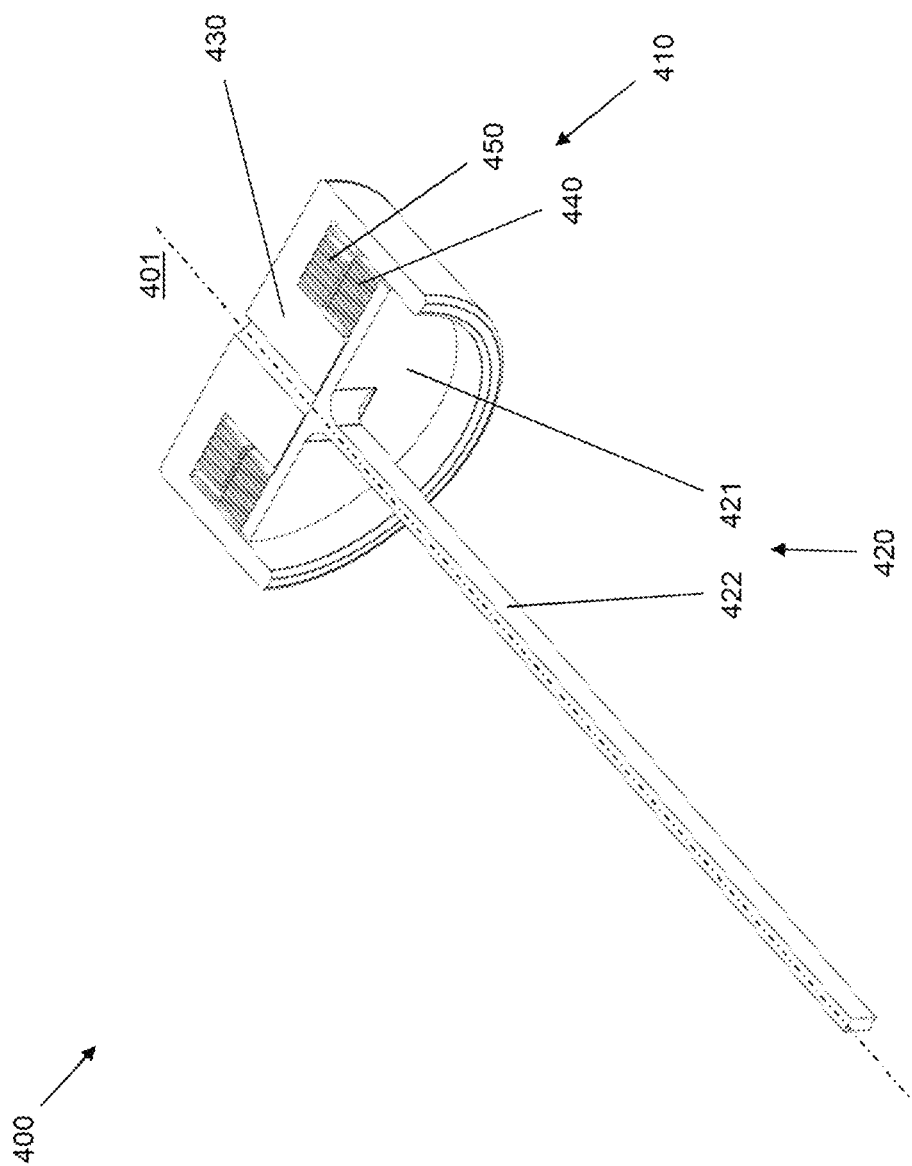
Figure 3:
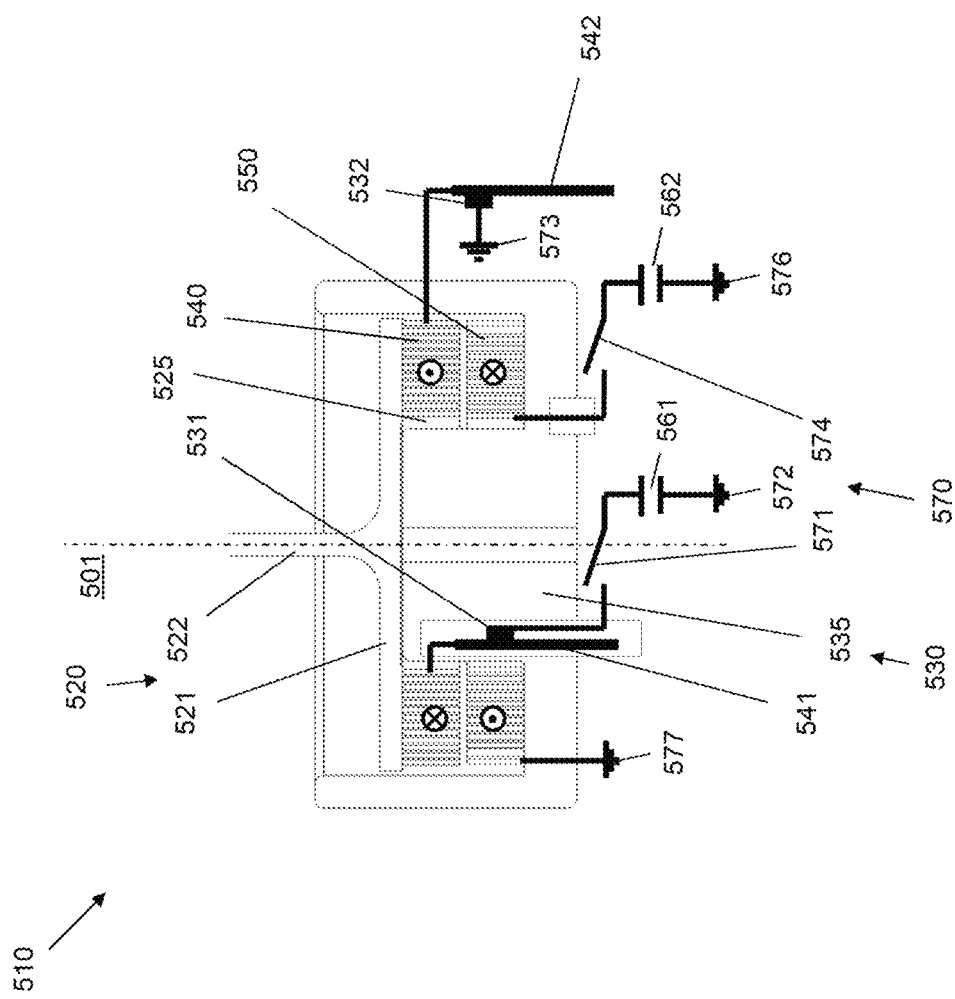
Figure 4:
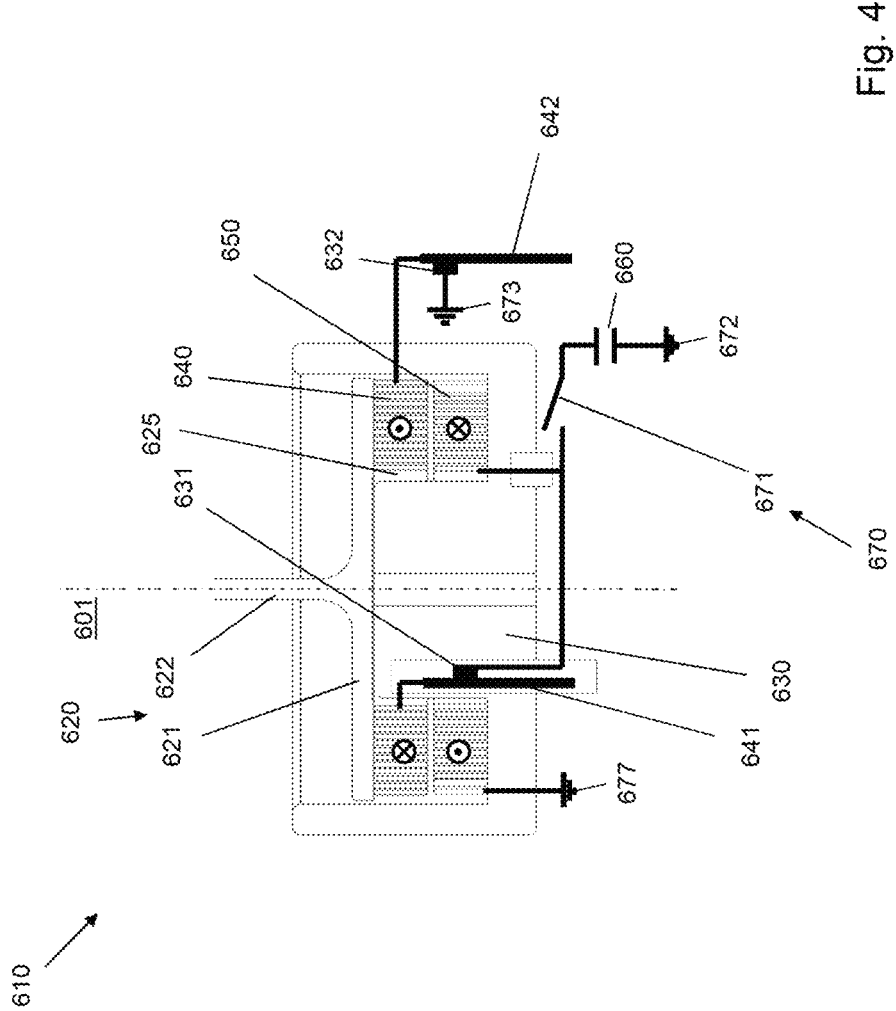

The invention is represented in a number of exemplary embodiments in the drawings, in which:

FIG. 1 shows a tool in a longitudinal section,
FIG. 2 shows a drive/working-piston unit of a tool,
FIG. 3 shows a drive of a tool, and
FIG. 4 shows a drive of a working piston.

In FIG. 1, a tool 10 for working a substrate (not shown), which is designed as a hand-held setting tool for driving fastening elements into the substrate, is shown in a longitudinal section. The tool 10 has a receptacle 20 which is formed as a stud guide and in which a fastening element 30 formed as a nail is received in order to be driven into the substrate along a working axis A (to the left in FIG. 1). For feeding fastening elements to the receptacle, the tool 10 comprises a magazine 40 in which the fastening elements are received individually or collectively in the form of a fastening element strip 50 and are transported one by one into the receptacle 20. For this, the magazine 40 has a spring-loaded feed element, not specifically denoted.

The tool 10 has a working piston 60, which comprises a piston plate 70 and a piston rod 80. The working piston 60 is intended to transfer the fastening element 30 out of the receptacle 20 along the working axis A into the substrate. In the process, the working piston 60 is guided by its piston plate 70 in a guide cylinder 95 along the working axis A. In exemplary embodiments that are not shown, the working piston is guided along the working axis by two, three or more guide elements, for example guide rods. The working piston 60 is in turn driven by a drive 65, which comprises a switching circuit 200 and a capacitor 300. The switching circuit 200 is intended to bring about a rapid electrical discharge of the previously charged capacitor 300 and to feed the discharge current thereby flowing to the drive 65.

The tool 10 also comprises a housing 110, in which the drive 65 is received, a handle 120 with an actuating element 130 formed as a trigger, an electrical energy store 140 formed as a storage battery, a control unit 150, a trigger switch 160, a contact-pressure switch 170, a temperature sensor 180 arranged on the drive 65 and electrical connecting lines 141, 161, 171, 181, 201, 301, which connect the control unit 150 to the electrical energy store 140, the trigger switch 160, the contact-pressure switch 170, the temperature sensor 180, the switching circuit 200 and the capacitor 300. In exemplary embodiments that are not shown, the tool 10 is supplied with electrical energy by means of a power cable instead of the electrical energy store 140 or in addition to the electrical energy store 140. The control unit comprises electronic components, preferably interconnected on a printed circuit board to form one or more electrical control circuits, in particular one or more microprocessors.

When the tool 10 is pressed against a substrate that is not shown (to the left in FIG. 1), a contact-pressure element, not specifically denoted, actuates the contact-pressure switch 170, which as a result transmits a contact-pressure signal to the control unit 150 by means of the connecting line 171. Triggered by this, the control unit 150 initiates a capacitor charging process in which electrical energy is conducted by means of the connecting line 141 from the electrical energy store 140 to the control unit 150 and by means of the connecting lines 301 from the control unit 150 to the capacitor 300 in order to electrically charge the capacitor 300. For this purpose, the control unit 150 comprises a switching converter, not specifically denoted, which converts the electrical current from the electrical energy store 140 into a suitable charge current for the capacitor 300. When the capacitor 300 is charged and the working piston 60 is in its ready-to-set position shown in FIG. 1, the tool 10 is in a ready-to-set state. Since the charging of the capacitor 300 is only brought about by the tool 10 pressing against the substrate, to increase the safety of bystanders a setting process is only made possible when the tool 10 is pressed against the substrate. In exemplary embodiments that are not shown, the control unit already initiates the capacitor charging process when the tool is switched on or when the tool is lifted off the substrate or when a preceding driving-in process is completed.

When the actuating element 130 is actuated, for example by being pulled using the index finger of the hand holding the handle 120, with the tool 10 in the ready-to-set state, the actuating element 130 actuates the trigger switch 160, which as a result transmits a trigger signal to the control unit 150 by means of the connecting line 161. Triggered by this, the control unit 150 initiates a capacitor discharging process, in which electrical energy stored in the capacitor 300 is conducted by means of the switching circuit 200 from the capacitor 300 to the drive 65, by the capacitor 300 being electrically discharged.

For this purpose, the switching circuit 200 schematically illustrated in FIG. 1 comprises two discharge lines 210, 220, which connect the capacitor 300 to the drive 65 and of which at least one discharge line 210 is interrupted by a normally open discharge switch 230. The switching circuit 200 with the drive 65 and the capacitor 300 may form an electrical oscillating circuit. Oscillation of this oscillating circuit back and forth and/or negative charging of the capacitor 300 may potentially have an adverse effect on efficiency of the drive 65, but can be suppressed with the aid of a free-wheeling diode 240. The discharge lines 210, 220 are electrically connected in each case to an electrode 310, 320 of the capacitor 300 arranged on a carrier film 330 by means of electrical contacts 370, 380 of the capacitor 300 arranged on an end face 360 of the capacitor 300 facing the receptacle 20, for example by soldering, welding, screwing, clamping or a form fit. The discharge switch 230 is preferably suitable for switching a discharge current with a high current intensity and is formed for example as a thyristor. In addition, the discharge lines 210, 220 are at a small distance from one another, so that a parasitic magnetic field induced by them is as low as possible. For example, the discharge lines 210, 220 are combined to form a busbar and are held together by a suitable means, for example a holder or a clip. In exemplary embodiments that are not shown, the free-wheeling diode is connected electrically in parallel with the discharge switch. In further exemplary embodiments that are not shown, no free-wheeling diode is provided in the circuit.

To initiate the capacitor discharge process, the control unit 150 closes the discharge switch 230 by means of the connecting line 201, whereby a high-intensity discharge current of the capacitor 300 flows through the drive 65, which drives the working piston 60 toward the receptacle 20 and the fastening element 30 received therein. As soon as the piston rod 80 of the working piston 60 meets a head, not denoted any more specifically, of the fastening element 30, the fastening element 30 is driven into the substrate by the working piston 60. Excess kinetic energy of the working piston 60 is absorbed by a braking element 85 of a spring-elastic and/or damping material, for example rubber or an elastomer, by the working piston 60 moving with the piston plate 70 thereof against the braking element 85 and being braked by the latter until it comes to a standstill. The working piston 60 is then reset to the ready-to-set position by a resetting device not denoted any more specifically.

In FIG. 2, a drive/working-piston unit 400 of a tool, for example the tool 10 shown in FIG. 1, is illustrated. The drive/working-piston unit 400 is shown cut away along a working axis 401 and comprises a partially shown drive 410, a working piston 420 and a stator 430. The working piston 420 has a piston plate 421 and a piston rod 422 and is intended to move relative to the stator 430 along the working axis 401. The drive 410 is intended to drive the working piston 420 along the working axis 401. For this purpose, the drive 410 comprises a piston coil capacitor (not shown) and a piston coil 440 arranged on the working piston 420. The piston coil 440 can be electrically connected to the piston coil capacitor in order during rapid discharge of the piston coil capacitor to be flowed through by current and to generate a magnetic field that brings about a repulsive force between the piston coil 440 and the stator 430 and accelerates the working piston 420 relative to the stator 430. The repulsive force between the piston coil 440 and the stator 430 is brought about for example by the fact that the magnetic field generated by the piston coil 440 passes through the stator 430 and induces in the stator 430 an electrical current, which in turn generates a magnetic field opposite to the magnetic field generated by the piston coil 440. For this purpose, the stator 430 consists of an electrically conducting material, for example copper, iron or an alloy thereof, which surrounds the working axis in an annular manner. In exemplary embodiments that are not shown, the stator has a frame and a ring conductor, which is arranged on the frame, preferably fastened to the frame, has high electrical conductivity and surrounds the working axis in an annular manner.

In addition, the drive 410 comprises a stator coil capacitor (not shown) and a stator coil 450 arranged on the working piston 420. The stator coil 450 can be electrically connected to the stator coil capacitor in order during rapid discharge of the piston coil capacitor to be flowed through by current and to generate a magnetic field that brings about a repulsive force between the stator coil 450 and the working piston 420 and accelerates the working piston 420 away from the stator 430. The repulsive force between the stator coil 450 and the working piston is brought about for example by the magnetic field generated by the stator coil 450 being opposite to the magnetic field generated by the piston coil 440. For this purpose, electrical current is preferably applied to the piston coil 440 and the stator coil 450 in opposite directions and overlapping in time, in particular at the same time, by the piston coil capacitor and the stator coil capacitor being discharged in a correspondingly timed and coordinated manner, for example controlled by a control unit that is not shown. The piston coil 440 and the stator coil 450 respectively have a piston coil axis and a stator coil axis, which coincide with the working axis 401 and are thus oriented parallel to one another. In order to return the working piston 420 to the starting position shown in FIG. 2, electrical current is preferably applied to the piston coil 440 and the stator coil 450 in the same direction and overlapping in time, in particular at the same time, so that the magnetic field generated by the stator coil 450 and the magnetic field generated by the piston coil 440 are in the same direction. This brings about an attractive force between the stator coil 450 and the working piston 420, and the working piston 420 is accelerated onto the stator 430.

In FIG. 3, a drive 510 of a tool, for example the tool 10 shown in FIG. 1, is illustrated. The drive 510 is shown cut away along a working axis 501 and is intended to drive a working piston 520 with a piston plate 521 and a piston rod 522 along the working axis 501 and to move it relative to a stator 530. The drive 510 comprises a piston coil capacitor 561, a stator coil capacitor 562, a switching circuit 570 with a first switch 571 and a second switch 572, a piston coil 540 arranged on the working piston 520 and a stator coil 550 arranged on the stator 530. The piston coil 540 can be electrically connected to the piston coil capacitor 561 in order during rapid discharge of the piston coil capacitor 561 to be flowed through by current. A current flow through the piston coil 540 generates a first magnetic field. The stator coil 550 can be electrically connected to the stator coil capacitor 562 in order during rapid discharge of the stator coil capacitor 562 to be flowed through by current. A current flow through the stator coil 550 generates a second magnetic field.

One electrode of the piston coil capacitor 561 is electrically connected to an input of the first switch 571 and can be charged with respect to a counter electrode of the piston coil capacitor 561, which is electrically connected to a first ground potential 572, for example the negative terminal of an electrical rechargeable battery or a battery. An output of the first switch 571 is electrically connected, preferably permanently wired, to a first electrical stator contact 531, which is formed as a contact brush and which the stator 530 has. An input of the piston coil 540 on an inner side of the piston coil 540 is electrically connected, preferably permanently wired, to a first piston contact 541, which is formed as a contact rail and which the working piston 520 has. The first piston contact 541 slides in an electrically conducting manner along the first stator contact 531 when the working piston 520 moves along the working axis 501. A first spring (not shown) loads the first stator contact 531 toward the first piston contact 541. In exemplary embodiments that are not shown, a spring additionally or alternatively loads the first piston contact toward the first stator contact.

An output of the piston coil 540 on an outer side of the piston coil 540 is electrically connected, preferably permanently wired, to a second piston contact 542, which is formed as a contact rail and which the working piston 520 has. The second piston contact 542 slides in an electrically conducting manner along a second stator contact 532 when the working piston 520 moves along the working axis 501. The stator 530 has the second stator contact 532, which is formed as a contact brush and is electrically connected to a second ground potential 573, which is preferably identical to the first ground potential 572. A second spring (not shown) loads the second stator contact 532 toward the second piston contact 542. In exemplary embodiments that are not shown, a spring additionally or alternatively loads the second piston contact toward the second stator contact. The piston contacts 541, 542 do not necessarily contact the stator contacts 531, 532 during the entire movement of the working piston. In some applications, contacting during the first 0.5 ms to 1 ms, in particular during the first 0.6 ms, is sufficient. The piston contacts 541, 542 have a length in the direction of the working axis 501 which for some areas of application is approximately 10 mm to 30 mm.

One electrode of the stator coil capacitor 562 is electrically connected to an input of the second switch 574 and can be charged with respect to a counter electrode of the stator coil capacitor 562, which is electrically connected to a third ground potential 576, for example the negative terminal of an electrical rechargeable battery or a battery. An output of the second switch 574 is electrically connected, preferably permanently wired, to an input of the stator coil 550 on an inner side of the stator coil 550. An output of the stator coil 550 on an outer side of the stator coil 550 is electrically connected to a fourth ground potential 577, which is preferably identical to the third ground potential 576.

The piston contacts 541, 542 are rigidly connected to the rest of the working piston 520 and move with the rest of the working piston 520. In exemplary embodiments that are not shown, the first and/or the second stator contact is formed as a slip ring. In further exemplary embodiments that are not shown, the first and/or the second stator contact is formed as a contact rail and the first or the second piston contact is formed as a contact brush or a slip ring. The second piston contact 542 and the second stator contact 532 are arranged radially outside the stator coil 550 and the piston coil 540 with respect to the working axis 501. In exemplary embodiments that are not shown, the first piston contact and the first stator contact are additionally or alternatively arranged radially outside the stator coil and/or the piston coil.

The rapid discharge of the capacitors 561, 562 via the piston coil 540 and the stator coil 550 can be triggered by means of the switching circuit 570, by the switches 571, 574 being closed when the capacitors 561, 562 are respectively electrically charged and the piston coil 540 and the stator coil 550 are respectively electrically connected to one of the capacitors 561, 562. Electrical current then flows on the one hand from the piston coil capacitor 561 through the first switch 571, through the first stator contact 531 and the first piston contact 541, from the inside to the outside through the piston coil 540 and finally through the second piston contact 542 and the second stator contact 532 to the second ground potential 573. On the other hand, electrical current flows from the stator coil capacitor 562 through the second switch 574, from the inside to the outside through the stator coil 550 and finally to the fourth ground potential 577. The first switch 571 and the second switch 574 are preferably closed at the same time.

The piston coil 540 and the stator coil 550 respectively have a piston coil axis and a stator coil axis, which coincide with the working axis 501 and are thus oriented parallel to one another. The piston coil 540 and the stator coil 550 are wound in the same direction and the electrical current flows through them in opposite directions, so that the first magnetic field and the second magnetic field are opposite to one another. In exemplary embodiments that are not shown, the coils are wound in opposite directions and the electrical current flows through them in the same direction. This brings about a repulsive force between the stator coil 550 and the piston coil 540, and thus between the stator 530 and the working piston 520, so that the working piston 520 is accelerated relative to the stator 530. The piston coil 540 and the stator coil 550 are flowed through by electrical current at the same time or overlapping in time, a first current intensity $I_1$ of the current flowing through the stator coil 550 being greater than a second current intensity $I_2$ of the current flowing through the piston coil 540.

The stator coil 550 has a first number of turns $N_1$ and the piston coil 540 has a second number of turns $N_2$, which is greater than the first number of turns $N_1$. Preferred is essentially $N_1 \cdot I_1 = N_2 \cdot I_2$, so that the magnetic fields generated by the coils 540, 550 are essentially the same size. In exemplary embodiments that are not shown, the piston coil and the stator coil have the same number of coil turns.

The working piston 520 has a piston frame 525, which preferably consists of a soft magnetic material, such as for example iron or an alloy thereof, for example steel. The piston frame 525 surrounds the piston coil 540 and extends in a circumferential direction with respect to the working axis 501. As a result, the second magnetic field generated by the piston coil 540 is intensified in the area of the stator coil 550 and the repulsive force between the stator 530 and the working piston 520 is increased. The piston plate 521 preferably consists of the soft magnetic material and particularly preferably forms the piston frame. The piston rod 522 also preferably consists of the soft magnetic material and is particularly preferably connected in one piece to the piston plate 521, which may increase a stiffness and/or mechanical robustness of the working piston 520. The stator 530 has a stator frame 535, which preferably consists of a soft magnetic material, such as for example iron or an alloy thereof, for example steel. The stator frame 535 surrounds the stator coil 550 and extends in a circumferential direction with respect to the working axis 501. As a result, the second magnetic field generated by the stator coil 550 is intensified in the area of the piston coil 540 and the repulsive force between the stator 530 and the working piston 520 is increased.

In FIG. 4, a drive 610 of a tool, for example the tool 10 shown in FIG. 1, is shown in a longitudinal section. The drive 610 is intended to drive a working piston 620 with a piston plate 621 and a piston rod 622 along the working axis 601 and to move it relative to a stator 630. The drive 610 comprises a capacitor 660, a switching circuit 670 with a switch 671, a piston coil 640 arranged on the working piston 620 and a stator coil 650 arranged on the stator 630. The piston coil 640 can be electrically connected to the capacitor 660 in order during rapid discharge of the capacitor 660 to be flowed through by a current, so that the capacitor 660 represents a piston coil capacitor. A current flow through the piston coil 640 generates a first magnetic field. The stator coil 650 can also be electrically connected to the capacitor 660 in order during rapid discharge of the capacitor 660 to be flowed through by current, so that the capacitor 660 also represents a stator coil capacitor. A current flow through the stator coil 650 generates a second magnetic field.

One electrode of the capacitor 660 is electrically connected to an input of the switch 671 and can be charged with respect to a counter electrode of the capacitor 660, which is electrically connected to a first ground potential 672, for example the negative terminal of an electrical rechargeable battery or a battery. An output of the switch 671 is electrically connected on the one hand to an input of the stator coil 650 on an inner side of the stator coil 650 and on the other hand to a first electrical stator contact 631, which is formed as a contact brush and which the stator 630 has. An input of the piston coil 640 on an inner side of the piston coil 640 is electrically connected to a first piston contact 641, which is formed as a contact rail and which the working piston 620 has. The first piston contact 641 slides in an electrically conducting manner along the first stator contact 631 when the working piston 620 moves along the working axis 601.

An output of the piston coil 640 on an outer side of the piston coil 640 is electrically connected to a second piston contact 642, which is formed as a contact bar and which the working piston 620 has. The second piston contact 642 slides in an electrically conducting manner along a second stator contact 632 when the working piston 620 moves along the working axis 601. The stator 630 has the second stator contact 632, which is formed as a contact brush and is electrically connected to a second ground potential 673, which is preferably identical to the first ground potential 672. An output of the stator coil 650 on an outer side of the stator coil 650 is electrically connected to a third ground potential 677, which is preferably identical to the first ground potential 672 and/or the second ground potential 673.

The rapid discharge of the capacitor 660 via the piston coil 640 and the stator coil 650 can be triggered by means of the switching circuit 670, by the switch 671 being closed when the capacitor 660 is electrically charged and the piston coil 640 and the stator coil 650 being electrically connected to the capacitor 660. The electrical current then flows from the capacitor 660 through the switch 671, on the one hand from the inside to the outside through the stator coil 650, on the other hand through the first stator contact 631 and the first piston contact 641, from the inside to the outside through the piston coil 640 and finally through the second piston contact 642 and the second stator contact 632 to the second ground potential 673. The piston coil 640 and the stator coil 650 are therefore electrically connected in parallel with one another and at the same time flowed through by electrical current.

The piston coil 640 and the stator coil 650 respectively have a piston coil axis and a stator coil axis, which coincide with the working axis 601 and are thus oriented parallel to one another. The piston coil 640 and the stator coil 650 are wound in opposite directions and flowed through by the electrical current in the same direction, so that the first magnetic field and the second magnetic field are opposite to one another. This brings about a repulsive force between the stator coil 650 and the piston coil 640, and thus between the stator 630 and the working piston 620, so that the working piston 620 is accelerated relative to the stator 630. The stator coil 650 has a first number of turns $N_1$ and the piston coil 640 has a second number of turns $N_2$, which is greater than the first number of turns $N_1$. Preferred is essentially $N_1 \cdot I_1 = N_2 \cdot I_2$, so that the magnetic fields generated by the coils 640, 650 are essentially the same size.

In exemplary embodiments that are not shown, the working piston has one or more further piston coils and/or the stator has one or more further stator coils. In further exemplary embodiments that are not shown, the piston coil enters the stator coil and the forces transmitted between the coils are repulsive and/or attractive forces. In further exemplary embodiments that are not shown, the coil axes of the piston coil and/or the stator coil are oriented in relation to one another or to the working axis in an angled manner, in particular at right angles.

The invention has been described using a series of exemplary embodiments that are illustrated in the drawings and exemplary embodiments that are not illustrated. The individual features of the various exemplary embodiments are applicable individually or in any desired combination with one another, provided that they are not contradictory. It is pointed out that the tool according to the invention can also be used for other applications, for example as a hammer drill or the like.

The invention claimed is:

1. A tool for working a substrate, the tool having a stator and a working piston, which is intended to move relative to the stator along a working axis, and the tool also having a drive, which is intended to drive the working piston along the working axis from a starting position onto the substrate, the drive having a stator coil arranged on the stator and being intended to apply electrical current of a first current intensity $I_1$ to the stator coil in order to generate a magnetic field which accelerates the working piston relative to the stator, the drive having a piston coil arranged on the working piston and being intended to apply electrical current of a second current intensity $I_2$ to the piston coil in order to generate a magnetic field which accelerates the working piston relative to the stator, the second current intensity $I_2$ being less than the first current intensity $I_1$.

2. The tool as claimed in claim 1, wherein the drive has a piston coil capacitor, the piston coil being electrically connectable to the piston coil capacitor in order during rapid discharge of the piston coil capacitor the electrical current of the first current intensity $I_1$ flows through the piston coil capacitor.

3. The tool as claimed in claim 1, wherein the drive has a stator coil capacitor, the stator coil being electrically connectable to the stator coil capacitor in order during rapid discharge of the stator coil capacitor the electrical current of the second current intensity $I_2$ flows through the stator coil capacitor.

4. The tool as claimed in claim 1, wherein the piston coil has a piston coil axis and the stator coil has a stator coil axis, which is oriented parallel to the piston coil axis.

5. The tool as claimed in claim 2, wherein the piston coil and the stator coil are flowed through by current in opposite directions during the rapid discharge of the piston coil capacitor and a stator coil capacitor in order to generate opposing magnetic fields.

6. The tool as claimed in claim 2, wherein the piston coil capacitor and a stator coil capacitor are identical.

7. The tool as claimed in claim 6, wherein the piston coil and the stator coil are electrically connected parallel to one another.

8. The tool as claimed in claim 1, wherein the stator coil has a first number of turns $N_1$, and wherein the piston coil has a second number of turns $N_2$, which differs from the first number of turns $N_1$.

9. The tool as claimed in claim 8, wherein $N_2 > N_1$.

10. The tool as claimed in claim 8, wherein essentially $N_1 \cdot I_1 = N_2 \cdot I_2$.

11. The tool as claimed in claim 1, wherein the stator has two electrical stator contacts and the working piston has two electrical piston contacts each sliding on one of the electrical stator contacts in order to apply the electrical current of the second current intensity $I_2$ to the piston coil.

12. The tool as claimed in claim 11, wherein the two electrical stator contacts each have a contact rail and the two electrical piston contacts each have a contact brush or a slip ring or vice versa.

13. The tool as claimed in claim 1, having a receptacle which is intended to receive a fastening element, the working piston being intended to transfer the fastening element received in the receptacle into the substrate along the working axis.

14. The tool as claimed in claim 1, wherein the stator coil generates a magnetic field that repels the working piston and the piston coil generates a magnetic field that repels the stator.

15. The tool of claim 4, wherein the stator coil axis coincides with the piston coil axis.

16. The tool as claimed in claim 2, wherein the drive has a stator coil capacitor, the stator coil being electrically connectable to the stator coil capacitor in order during rapid discharge of the stator coil capacitor the electrical current of the second current intensity $I_2$.

17. The tool as claimed in claim 2, wherein the piston coil has a piston coil axis and the stator coil has a stator coil axis, which is oriented parallel to the piston coil axis.

18. The tool as claimed in claim 3, wherein the piston coil and the stator coil are flowed through by current in opposite directions during the rapid discharge of a piston coil capacitor and the stator coil capacitor in order to generate opposing magnetic fields.

19. The tool as claimed in claim 3, wherein a piston coil capacitor and the stator coil capacitor are identical.

20. The tool as claimed in claim 2, wherein the stator coil has a first number of turns $N_1$, and wherein the piston coil has a second number of turns $N_2$, which differs from the first number of turns $N_1$.

* * * * *

UNITED STATES PATENT AND TRADEMARK OFFICE
CERTIFICATE OF CORRECTION

PATENT NO. : 12,128,536 B2
APPLICATION NO. : 17/783464
DATED : October 29, 2024
INVENTOR(S) : Chafic Abu Antoun et al.

Page 1 of 1

It is certified that error appears in the above-identified patent and that said Letters Patent is hereby corrected as shown below:

On the Title Page

(72) Inventors:
The correct inventors are, in order, -- Chafic ABU ANTOUN, Buchs (CH); Tilo DITTRICH, Feldkirch (AT); Albert BINDER, Buchs (CH); Manuel GUT, Göfis (AT); Florian SCHMID, Buchs SG (CH); Jasmin SMAJIC, Schöfflisdorf (CH); Arno MECKLENBURG, Berlin (DE) --

Signed and Sealed this
Fifteenth Day of July, 2025

Coke Morgan Stewart
*Acting Director of the United States Patent and Trademark Office*